April 29, 1941.
C. C. COONS ET AL
2,240,173
ABSORPTION REFRIGERATING APPARATUS
Original Filed Dec. 30, 1936
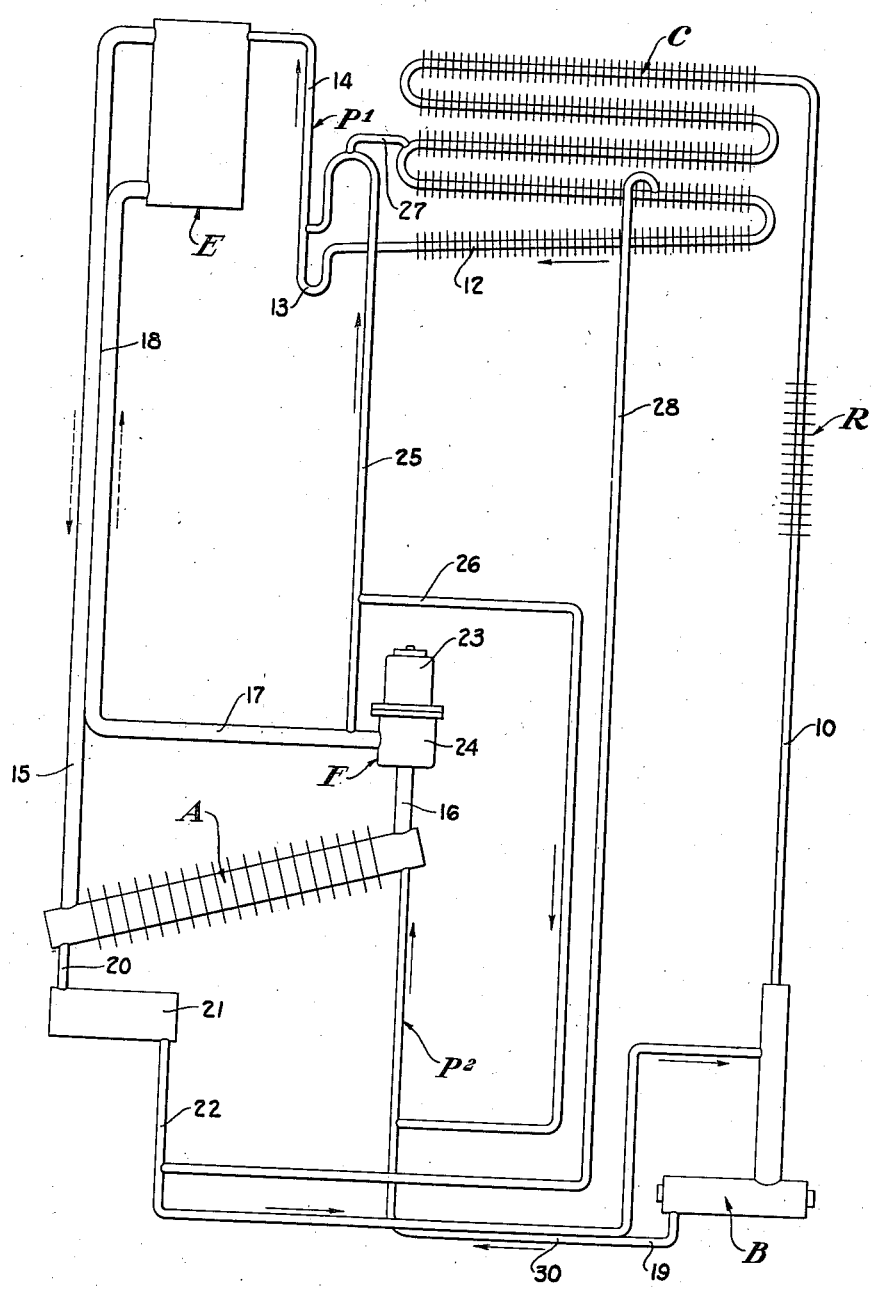
INVENTOR
Curtis C. Coons
Rudolph S. Nelson
BY
Harry S. Demarest
ATTORNEY Patented Apr. 29, 1941

2,240,173

UNITED STATES PATENT OFFICE 2,240,173

ABSORPTION REFRIGERATING APPARATUS

Curtis C. Coons, North Canton, Ohio, and Rudolph S. Nelson, Larchmont, N. Y., assignors to The Hoover Company, North Canton, Ohio, a corporation of Ohio Application December 30, 1936, Serial No. 118,284
Renewed May 19, 1939

26 Claims. (Cl. 62—119.5)

This invention relates to absorption refrigerating systems of the continuous type, and more particularly to that type which employs an inert gas as a pressure equalizing medium.

Absorption refrigeration systems of the three fluid type include a refrigerant boiler, generator, an evaporator, and an absorber as principal elements. An inert gas or pressure equalizing medium is circulated through conduits interconnecting the absorber and the evaporator, while an absorption liquid for the refrigerant is circulated through conduits interconnecting the absorber and the generator. It is also often desirable to circulate liquid refrigerant through a portion of the refrigerant medium circuit in an absorption system. The volume of pressure equalizing medium circulated between the absorber and evaporator is much greater than the volume of absorption solution circulated between the absorber and the generator or the volume of refrigerant liquid which it is desired to circulate in some part of its normal circuit. It is essential that the apparatus be provided with some means for assuring the proper circulation of the absorption medium in its circuit, of liquid refrigerant through some part of its circuit, and of the pressure equalizing medium in its circuit. Heretofore, it has been common practice to employ separate and independent means for circulating the inert medium and the liquid mediums.

According to the present invention, it is proposed to circulate all three mediums by a common source of energy without sacrificing the advantages of prior known modes of circulating these mediums and at the same time avoiding the many disadvantages. More specifically, this invention proposes to create a pressure differential in the inert gas circuit for the purpose of circulating the gas therein at a desired rate, and to employ this pressure differential to circulate the absorption medium in its circuit at a desired rate which is much less than but proportional to the rate of inert gas circulation, and additionally to circulate liquid refrigerant. A preferred manner of practicing the invention is to bleed off a relatively small portion of gas from a high pressure area in the inert gas circuit and to bubble this gas into a column of absorption liquid and into a column of liquid refrigerant. The mixture of liquid and gas results in the lowering of the specific gravity of these columns and the raising of the surface level of the liquid in each to an elevated point. The inert gas does not condense under the conditions prevailing within the system, and is not soluble in either the liquid refrigerant or the absorption liquid.

Heretofore, it has been common practice to employ a vapor lift pump for circulating the absorption solution. This pump is operated by bubbles of refrigerant vapor produced in the boiler. Such pumps have many disadvantages and limitations which greatly restrict their use. For example, the small diameter vapor lift pump must be located in a high temperature region in which it is subject to corrosion and clogging. The refrigerant vapor must be maintained at a high temperature to prevent its condensation and its absorption by the absorption liquid. The rate of circulation varies over a wide range as it is a function of the boiler temperature, and is accordingly difficult to control.

In prior constructions, it has been necessary to locate the condenser above the evaporator or to provide complex and unreliable arrangements for elevating the refrigerant into the evaporator when the condenser extends below the top of the evaporator. It is highly desirable to resort to this latter arrangement in adapting the refrigeration system to use in a household refrigerator, but this has not been possible heretofore because of the lack of a suitable liquid refrigerant elevating device. A device which we have found highly satisfactory forms an important feature of the present invention and comprises a by-pass from the gas circuit and having a portion in common with a part of the refrigerant medium circuit containing liquid refrigerant. The arrangement is such that inert gas is bubbled into the liquid refrigerant under pressure thereby causing the liquid to be elevated from the bottom of the condenser to an evaporation zone thereabove. The refrigerant which does not evaporate as the gas bubbles therethrough may then be brought in contact with other inert gas for the production of additional refrigeration.

It will therefore be appreciated that the present invention entirely avoids many of the limitations, disadvantages and undesirable characteristics of known absorption refrigeration systems.

Both the refrigerant and the absorption liquid are circulated by gas lift pumps which are the simplest known form of pump. But instead of being operated by refrigerant or absorbent vapor, the present invention shows how the inert medium can be employed for this purpose. Unlike absorbent or refrigerant vapor, the inert medium does not condense nor is it absorbed by the liquids into which it is bubbled. Nor is the introduction of the inert gas dependent upon the temperature of either the gas itself or of the liquids into which it is introduced, and the rate of circulation of the liquids by the pumps is substantially unaffected by wide variations in the temperature of the gas supplied thereto. It is therefore possible to locate the pumps in any part of the system and to circulate all the fluids in the system at will and independently of the temperature of the boiler.

By reason of our novel arrangement of the inert gas, refrigerant medium and absorption solution circuits, it is possible to circulate the inert gas, refrigerant and absorption liquids at their proper respective rates for optimum operating conditions without resorting to the use of valves or other restricting devices. And this is accomplished by the simple expedient of diverting only a very small percentage of the main inert gas stream from its normal circuit between the evaporator and absorber. In addition to the many advantages provided by our arrangement, as hereinabove pointed out, we have found that it also provides an unusually facile method of governing and maintaining the optimum operating conditions within the system.

It is accordingly the object of this invention to provide a novel absorption refrigeration system operating in a novel manner and having the advantages and characteristics noted by way of example hereinabove and pointed out in greater detail in the following description of a preferred mode of practicing the invention.

The single figure of the drawing is not drawn to scale and the several principal vessels are located at approximately the correct height, it being understood that since liquid levels stand in the apparatus at various heights under different conditions, the vessels should be located in accordance with known engineering practice.

Referring to the drawing in detail, a continuous absorption refrigerating apparatus is shown as consisting of a boiler-analyzer assembly B, a rectifier R, an absorber A, a condenser C, an evaporator E, a gas pump F and two gas lift pumps P¹ and P² as principal elements, these vessels being connected to form the complete refrigerating system by various conduits some of which are in heat exchange relation.

The boiler-analyzer assembly B may be of the usual construction having a main horizontally extending body portion and an upstanding portion near one end thereof constituting an analyzer.

A gas conduit 10 leads from the top of the analyzer through the vertically positioned rectifier R and then into the top of the condenser C. Both the rectifier and the condenser may be cooled in any suitable manner as by the usual heat radiating fins. The discharge end 12 of the condenser leads into the top of the evaporator E through the liquid trap 13 and the conduit 14. As will appear more fully hereinafter conduit 14 not only serves as a part of the refrigerant medium circuit but also as a part of the gas lift pump P¹.

Absorber A is located below the evaporator E and is connected thereto by means of the gas conduits 15, 16, and 17. Conduits 15 and 17 are in heat exchange relation at 18, it being understood that any suitable form of heat exchanger may be utilized. Conduit 19 connects the lower part of the boiler B with the pump P² which discharges into the absorber A. A return liquid conduit 20 leads from the lower end of the absorber A into a reservoir 21, from whence a conduit 22 leads back into an upper portion of the analyzer column.

A pump F consisting of a motor 23 and a centrifugal fan unit 24 has an inlet connected to conduit 16 and an outlet connected to conduit 17. It will also be observed that conduit 25 leads to the gas lift pump P¹, and a second conduit 26 leads to gas lift pump P².

We have discovered that a miniature fan is capable of producing a pressure differential equivalent to several inches of water when operated in a gas having a relatively high molecular weight and under pressures normally prevailing in absorption systems using a pressure equalizing medium. If an inert gas of low molecular weight like hydrogen is used, it is necessary to employ a fan many times larger than is the case with a dense gas. The larger fan of course requires a larger motor and consumes more power than the miniature fan and motor used in our construction. The significance of the foregoing will be apparent from the fact that we have found that for the same amount of useful work, a tremendous saving in operating and construction costs may be made by employing a dense inert gas like air or nitrogen rather than a light gas like hydrogen.

Furthermore, since relatively large pressure differences may be generated by a small fan operating in a dense gas, it is possible to utilize this pressure to circulate the inert gas in the normal manner as well as to operate liquid gas lift pumps by by-passing a small portion of the total quantity of the gas and introducing the same into the liquid pumps. Since the quantity of gas required to operate a liquid gas lift pump installed in a refrigerating apparatus is small in relation to the total quantity of gas discharged by the fan, the additional load imposed on the fan is insignificant.

Pump F is accordingly a very small, motor driven fan, preferably of the centrifugal type, though it will be understood that other types of fans may be used if desired. In the average size household refrigeration system the power required to drive the fan is about the same as that required by the smallest practical electric motor. Such a fan is capable of producing a sufficient pressure differential in the gas circuit to circulate the inert gas, to elevate condenser from the condenser into the evaporator, and to circulate the absorption fluid between the boiler, absorber and analyzer column. The gas pump F can be controlled in any desired manner such as manually or automatically in accordance with temperature conditions, for instance, in some part of the system.

The apparatus just described operates in the following manner: The system may be charged, in accordance with known practices, with any suitable fluids such as ammonia as refrigerant, water as an absorbent, and any dense inert gas, such as nitrogen which serves as a pressure equalizing medium. The boiler, containing a mixture of ammonia and water may be heated in any suitable manner such as by an electric cartridge heater or by a fluid fuel burner. Ammonia in gaseous form is liberated from the solution and will pass upwardly through conduit 10, rectifier R, and into the top portion of the condenser C. Any water vapor which remains after passing through the analyzer column condenses as it passes through the rectifier and flows back into the analyzer column.

The gaseous ammonia condenses in the condenser and flows downwardly into conduit 12 and liquid seal 13, and rises to a level somewhat above the connection of conduit 14 with conduit 25. If gas pump F is operating, the inert gas circulates between the evaporator, heat exchanger and absorber by means of conduits 15, 16 and 17 and in the direction indicated by arrows.

A small part of the inert gas discharged from pump F is bled off from conduit 17 by pipes 25 and 26. Pipe 25 extends upwardly a slight distance above overflow pipe 28 and then downwardly into pump P¹ of which condensate conduit 14 is a part. Rising bubbles of gas and condensate then form in conduit 14 in much the same manner as in the well known vapor lift pump used in refrigerant generators. This action causes the condensate to be carried into the evaporator wherein it evaporates into the inert gas flowing therethrough producing refrigeration.

Another portion of the inert gas is bled from conduit 17 and is led into pump P² which is connected to the lean absorbent conduit 19. Bubbles of gas and absorption fluid are then formed in pump P² with the result that the liquid is elevated into the top of the absorber.

Absorber A may be of any desired construction, and may have baffles on the interior serving to bring about a more intimate contact between the gases and liquids therein. Any suitable cooling means may be provided for carrying away the heat of absorption such as air cooled heat radiating fins.

The enriched absorption fluid flows from the absorber through conduit 20 into receiving vessel 21. This vessel is not essential and may be omitted if desired. From vessel 21 the enriched absorption fluid flows back to the analyzer column through conduit 22 after passing in heat exchange relation at 30 with weak absorption fluid from the boiler. The enriched absorption fluid returned to the analyzer immediately comes into contact with bubbles of a vapor mixture of ammonia and water vapor. Since the enriched absorption fluid being returned to the analyzer has a lower boiling point than the solution in the boiler from which the bubbles just mentioned were generated, the rich solution will start to boil from the heat derived from the condensation of a part of the ammonia and water vapor forming said bubbles. Among the many advantages of this operation are the following: Water vapor which would otherwise pass into the rectifier, and possibly into the condenser, is condensed in the analyzer. The heat of condensation of the water vapor is utilized to liberate ammonia from the rich solution instead of being dissipated to the atmosphere in the rectifier and condenser and thereby wasted. A considerable amount of exceedingly rich ammonia vapor is liberated by the gentle heating of rich solution resulting from the condensation of water vapor in the analyzer. And of course, the heat input to the boiler from the burner is considerably less than would be the case in the absence of the analyzer.

It is therefore seen that we have devised a refrigerating system not only having the many advantages to be obtained by forcibly circulating the pressure equalizing medium, but we have utilized the pressure differential obtained in such a system to simultaneously elevate condensate into an evaporator, and weak absorption fluid into an absorber from whence it flows by gravity back to an analyzer column in the generator assembly.

According to the foregoing it is apparent that the condenser may be positioned below the top of the evaporator, and the absorber generator assembly may be made much more compact than heretofore. Moreover the flow of refrigerant, inert gas, and absorption fluid may be so proportioned relative to one another by a proper design of the various parts of the apparatus as to give a maximum efficiency.

Other important advantages of our construction are that the flow of absorption solution in the system is independent of the heat input to the boiler; and the flow of the pressure equalizing medium is not dependent on changes in specific gravity of different portions of the medium.

Attention is called to the vent pipe 27 leading from an intermediate portion of the condenser and discharging into some other part of the system such as into the top of the loop in gas conduit 25. A liquid overflow conduit 28 is also provided, and functions to discharge liquid condensate into the absorption fluid circuit in the event the condensate collects in the condenser at a much greater rate than it is being discharged therefrom by means of the gas lift pump.

It is also evident from the foregoing disclosure that operation of the system is entirely dependent upon the operation of pump F, and should this element be de-energized, the system will almost immediately cease to produce refrigeration. It is therefore a very simple matter to control the system by simply energizing or de-energizing pump F either manually or by automatic means such as a temperature or a pressure responsive means.

While only one embodiment of the invention has been shown and described herein, it is apparent that various changes may be made in the arrangement and construction of parts without departing from the spirit of the invention or the scope of the annexed claims.

We claim:

1. In an absorption refrigerating system of the type using a heavy inert gas, a generator, a condenser, an evaporator, an absorber, and a gas pump for circulating the inert gas, gas lift pumps for lifting liquid refrigerant from the condenser to the evaporator and weak aqua from the generator to the absorber, and means supplying heavy inert gas from the gas pump to said gas lift pumps whereby the gas pump positively circulates the liquids in the system.

2. An absorption refrigerating system comprising a boiler-analyzer, a condenser, an evaporator, a gas pump, and an absorber, a conduit connecting the analyzer and the condenser, conduits interconnecting the gas pump, evaporator and absorber to form an inert gas circuit, conduits interconnecting the boiler-analyzer and absorber to form an absorption fluid circuit, a conduit connecting the condenser and evaporator to form a liquid refrigerant circuit, and means interconnecting the pressure side of the inert gas circuit with the liquid refrigerant and absorption fluid circuits whereby the flow of fluid in each circuit is proportional to the flow in each of the other circuits.

3. The device described in claim 2 wherein the conduit from the condenser to the evaporator connects with the lower portion of the condenser, and an overflow conduit connects the condenser and the absorption liquid circuit.

4. The device described in claim 2 wherein the conduit from the condenser to the evaporator connects with the lower portion of the condenser, an overflow conduit connecting the condenser and the absorption fluid circuit, the condenser outlet being below the evaporator, and a vent connecting the high pressure side of the gas pump and the condenser at a point above the level of the overflow connection.

5. A method of circulating the fluids in a three fluid refrigerating system of the type having a condenser, an evaporator, a boiler and an absorber, and utilizing a dense inert gas as one of the three fluids, which method comprises lifting refrigerant from the condenser to the evaporator and lifting weak aqua from the boiler to the absorber by introducing thereinto dense inert gas under pressure.

6. That improvement in the art of absorption refrigeration wherein a dense inert gas circuit is provided for the evaporator and absorber which comprises lifting both liquid refrigerant to the evaporator and liquid absorption medium to the absorber by bleeding off a portion of said dense inert gas and introducing it into a column of liquid refrigerant and a column of liquid absorption medium.

7. A three fluid refrigerating system utilizing a dense inert gas as one of the fluids comprising, a boiler-analyzer, a condenser, an evaporator, an absorber and a gas pump for circulating the dense inert gas, the condenser outlet being below an upper portion of the evaporator, a gas lift pump connecting the condenser outlet and the evaporator, the liquid level in the boiler-analyzer being below the absorber, a gas lift pump connecting the boiler and the absorber, and means for conveying gas under pressure from the gas pump and introducing the gas into said gas lift pumps to operate the same.

8. The device of claim 7 wherein the means for conveying gas from the gas pump comprises means for bleeding off a small portion of the dense inert gas on the pressure side of the gas pump and supplying it to the gas lift pumps.

9. An absorption refrigeration system comprising, a liquid refrigerant circuit including a condenser and an evaporator, a dense inert gas circuit including an absorber, a gas pump and the evaporator, an absorption fluid circuit including a boiler and the absorber, means interconnecting a high pressure portion of the inert gas circuit to the liquid refrigerant and absorption fluid circuits whereby circulation of the fluids is independent of the relative vertical positions of the elements of the system within the pumping limits of said pump.

10. That method of producing refrigeration in a system including, liquid refrigerant, absorption fluid, and dense inert gas circuits; which comprises positively circulating the dense inert gas, bleeding off a portion of the dense inert gas, and utilizing dense inert gas so bled to positively circulate the liquids in the liquid refrigerant and absorption fluid circuits.

11. A three fluid, continuous absorption refrigeration apparatus which is relatively low in vertical extent comprising a boiler-analyzer assembly, a condenser thereabove, an evaporator having a portion thereof above the discharge end of said condenser, an absorber positioned above the normal liquid level in the boiler-analyzer-assembly, conduits interconnecting said elements in circuit, and means including a motor-driven gas circulating fan operable to elevate refrigerant liquid from said condenser into the upper portion of the evaporator, and to elevate weak absorption fluid from said boiler into the absorber from whence it returns by gravity to the upper part of said analyzer.

12. The method of controlling refrigeration in a three fluid absorption refrigerating system having an evaporating zone, an absorbing zone, a generating zone, and a condensing zone; comprising, circulating a dense inert gas under pressure between the evaporating and absorbing zones, bleeding off a fixed proportion of the dense inert gas so circulated, lifting liquid refrigerant from the condensing to the evaporating zones and absorption fluid from the generating to the absorbing zones by the dense inert gas so bled, the quantity of liquid so lifted being proportional to the quantity of dense inert gas supplied.

13. That method of controlling refrigeration in a three fluid refrigerating system wherein refrigeration is produced by evaporating liquid refrigerant into a dense inert gas, and having an evaporating zone, an absorbing zone, a generating zone, and a condensing zone; which method comprises circulating the dense inert gas under pressure between the evaporating and absorbing zones, diverting a fixed proportion of the dense inert gas under pressure, lifting a quantity of liquid refrigerant from the condensing to the evaporating zones and a quantity of absorption liquid from the generating to the absorbing zones proportional to the quantity of inert gas so diverted by introducing a part of the diverted inert gas into columns of liquid refrigerant and absorption fluid.

14. A method of refrigeration which includes separately maintaining a body of liquid refrigerant and a body of liquid absorbent for the refrigerant, circulating a stream of inert pressure equalizing medium between an evaporating zone and an absorbing zone, bubbling a portion only of said circulating stream into said body of refrigerant and then returning said portion to the main stream of inert medium, bubbling another portion of the inert medium into said body of liquid absorbent and then returning said portion to the main stream of inert medium, and initiating the circulation of one of said liquids through one of said zones as the result of bubbling inert gas thereinto.

15. A method of refrigeration which includes causing the circulation of inert gas in a circuit having a place of evaporation and a place of absorption, evaporating refrigerant fluid in the presence of inert gas in said place of evaporation, absorbing refrigerant fluid from inert gas into absorbent fluid in said place of absorption, separating refrigerant fluid from said absorbent fluid out of the presence of said inert gas, supplying separated refrigerant fluid to said place of evaporation, supplying absorbent fluid to said place of absorption, causing said circulation of inert gas by propelling inert gas in said circuit by force produced outside of said circuit, and causing said refrigerant fluid to be supplied to said place of evaporation and said absorbent fluid to be supplied to said place of absorption by diverting a portion of said propelled inert gas stream into a body of said refrigerant fluid and into a body of said absorbent fluid.

16. A refrigeration system including a generator, an absorber, a refrigerant receiver, an evaporator, and conduits connecting said parts to provide a circuit for recirculating refrigerant fluid including the generator, absorber, refrigerant receiver and evaporator, a circuit for recirculating absorption liquid including the generator and the absorber, and a circuit for recirculating inert gas including the evaporator and absorber, a gas impeller situated in the gas space of the last named circuit and motivated to circulate the inert gas through the evaporator and absorber, said system including a liquid column in the circuit for absorption liquid and a liquid column in the circuit for the refrigerant fluid, both of said columns of liquid reacting against gas pressure produced by said impeller to permit the impeller to build up appreciable pressure for producing flow in the system, and means for by-passing a portion of the gas flowing in said inert gas circuit and passing one portion thereof into the liquid column in said circuit for refrigerant fluid and for passing another portion into the liquid column in said circuit for absorption liquid to promote the circulation of the refrigerant medium in the refrigerant fluid circuit and the circulation of the absorption liquid in the absorption liquid circuit.

17. A refrigeration system including a generator, an absorber, a refrigerant receiver, an evaporator, and conduits connecting said parts to provide a circuit for recirculating refrigerant fluid including the generator, absorber, refrigerant receiver and evaporator, a circuit for recirculating absorption fluid including the generator and the absorber, and a circuit for recirculating inert gas including the evaporator and absorber, said conduits also including therein a gas lift pump in said absorption fluid circuit and a gas lift pump in one of said other circuits, a gas impeller situated in the gas space of the inert gas circuit and motivated to circulate the inert gas through the evaporator and absorber and means for by-passing a portion of said circulating inert gas from the pressure side of said gas impeller and supplying the same to said gas lift pumps to promote the circulation of the absorption fluid in its circuit and to promote the circulation of another fluid in said other circuit.

18. A refrigeration system including a generator, an absorber, a refrigerant receiver, an evaporator, and conduits connecting said parts to provide a circuit for recirculating refrigerant fluid including the generator, absorber, refrigerant receiver and evaporator, a circuit for recirculating absorption liquid including the generator and the absorber, and a circuit for recirculating inert gas including the evaporator and absorber, a plurality of gas lift pumps located in a plurality of said circuits, a gas impeller situated in the gas space of the inert gas circuit and motivated to circulate the inert gas through the evaporator and absorber, and means for supplying a portion only of the inert gas circulated in said gas circuit to each of said gas lift pumps to actuate the same.

19. A refrigeration system including a generator, an absorber, a refrigerant receiver, an evaporator, and conduits connecting said parts to provide a circuit for recirculating refrigerant fluid including the generator, absorber, refrigerant receiver and evaporator, a circuit for recirculating absorption liquid including the generator and the absorber, and a circuit for recirculating inert gas including the evaporator and absorber, a gas impeller situated in the gas space of the last named circuit and operative to reduce the inert gas pressure on the inlet side thereof and to raise the gas pressure on the discharge side thereof, a gas lift pump in said circuit for absorption liquid, a gas lift pump in one of said other circuits, and means for supplying a portion only of the inert gas from the discharge side of said gas impeller to each of said gas lift pumps, one of said pumps being so associated with said inert gas circuit and with said last named means that one end of the pump is connected to the inert gas circuit adjacent the inlet of the gas impeller, and so that the opposite end of said pump is connected to the inert gas circuit adjacent the discharge side of the gas impeller.

20. A refrigeration system including a generator, an absorber, a refrigerant receiver, an evaporator, and conduits connecting said parts to provide a circuit for recirculating refrigerant fluid including the generator, absorber, refrigerant receiver and evaporator, a circuit for recirculating absorption liquid including the generator and the absorber, and a circuit for recirculating inert gas including the evaporator and absorber, means in said gas circuit for creating a pressure differential therein to circulate the inert gas, a gas lift pump in said circuit for absorption liquid, a gas lift pump in one of said other circuits, means for supplying a portion of the circulating inert gas at an elevated pressure to each of said gas lift pumps to actuate the same, said pumps and said last named means being so constructed and arranged that substantially the full pressure differential developed by said pressure differential creating means is applied across one of said pumps and so that a pressure differential substantially less than that applied across said one pump is applied across the other pump, whereby one of said pumps is adapted to elevate a liquid therein to a higher elevation than the other pump.

21. In combination, an absorption refrigeration apparatus comprising a generator, a refrigerant liquefying means, an evaporator, an absorber, and conduits interconnecting the same and providing a refrigerant medium circuit including said generator, liquefier, evaporator and absorber and including a portion adapted to contain a body of liquid refrigerant, a pressure equalizing medium circuit including said evaporator and said absorber, and an absorption medium circuit including said generator and said absorber, a portion of said equalizing medium circuit having two fluid passageways connected in parallel, one of said parallel fluid passageways being so positioned as to normally contain a body of liquid absorption medium for said refrigerant medium, and means for circulating pressure equalizing medium under pressure through said pressure equalizing medium circuit and for bubbling pressure equalizing medium into said body of liquid absorption medium and for bubbling the pressure equalizing medium into said body of liquid refrigerant medium in said refrigerant medium circuit.

22. In combination, an absorption refrigeration apparatus comprising a generator, a refrigerant liquefying means, an evaporator, an absorber, and conduits interconnecting the same and providing a refrigerant medium circuit including said generator, liquefier, evaporator and absorber and including a portion adapted to contain a body of liquid refrigerant, a pressure equalizing medium circuit including said evaporator and said absorber, and an absorption medium circuit including said generator and said absorber, a portion of said equalizing medium circuit having two fluid passageways connected in parallel, one of said parallel fluid passageways being so positioned as to normally contain a body of liquid absorption medium for said refrigerant medium, means for circulating pressure equalizing medium under pressure through said pressure equalizing medium circuit and for bubbling pressure equalizing medium into said body of liquid absorption medium to circulate the same in the absorption medium circuit and for bubbling the pressure equalizing medium into said body of liquid refrigerant medium in said refrigerant medium circuit to raise the liquid to an elevated point.

23. An absorption refrigeration system comprising in combination, a refrigerant generator, a refrigerant liquefier, an evaporator, an absorber, conduits interconnecting said absorber and said generator to provide a closed absorption solution circuit therebetween, conduits interconnecting said evaporator and said absorber to provide a closed pressure equalizing medium circuit therebetween, conduits including said pressure equalizing medium circuit and said absorption solution circuit providing a closed refrigerant medium circuit between said generator, liquefier, evaporator and absorber, said pressure equalizing medium circuit including a plurality of by-pass conduits connected in parellel in said pressure equalizing medium circuit, one of said by-pass conduits having a portion in common with said absorption solution circuit adapted to contain liquid absorption medium, another of said by-pass conduits having a portion in common with said refrigerant medium circuit adapted to contain liquid refrigerant, and means for circulating pressure equalizing medium under pressure through said pressure equalizing medium circuit and for bubbling a portion only of the equalizing medium into absorption liquid and into refrigerant liquid.

24. An absorption refrigeration system comprising in combination, a refrigerant generator, a refrigerant liquefier, an evaporator, an absorber, conduits interconnecting said absorber and said generator to provide a closed absorption solution circuit therebetween, conduits interconnecting said evaporator and said absorber to provide a closed pressure equalizing medium circuit therebetween, conduits including said pressure equalizing medium circuit, and said absorption solution circuit providing a closed refrigerant medium circuit between said generator, liquefier, evaporator and absorber, said pressure equalizing medium circuit including a plurality of by-pass conduits connected in parallel in said pressure equalizing medium circuit, one of said by-pass conduits having a portion in common with said absorption solution circuit adapted to contain liquid absorption medium, another of said by-pass conduits having a portion in common with said refrigerant medium circuit adapted to contain liquid refrigerant, and means for circulating pressure equalizing medium under pressure through said pressure equalizing medium circuit and for bubbling equalizing medium into absorption liquid and into refrigerant liquid to circulate absorption medium in its circuit and to raise liquid refrigerant to an elevated point.

25. An absorption refrigeration system comprising in combination, a refrigerant generator, a refrigerant liquefier, an evaporator, an absorber, conduits providing a refrigerant medium circuit through said generator, liquefier, evaporator and absorber, an inert gas circuit including said evaporator and absorber, and an absorption medium circuit including said generator and said absorber, means providing a plurality of inert gas passages connected in parallel with said inert gas circuit one of said parallel passages having a portion in common with said absorption solution circuit and another of said parallel passages having a portion in common with said refrigerant medium circuit, said last-mentioned portion being constructed and arranged to contain a body of liquid refrigerant, and means for circulating inert gas under pressure through the inert gas circuit and said parallel passages and for introducing inert gas into said body of liquid refrigerant below the surface level thereof.

26. That method of producing refrigeration which includes circulating a refrigerant medium soluble in an absorbent medium in a circuit inculding a place of distillation, a place of liquefaction, a place of evaporation, and a place of absorption, circulating an inert medium in a circuit from said place of evaporation to said place of absorption and back to the place of evaporation, said inert medium being circulated through a portion of its circuit in a plurality of divided and parallel streams, a body of liquid refrigerant in one of said streams of inert medium and into which the inert gas bubbles, a body of impoverished absorption medium in another of said streams of inert medium and into which the inert gas bubbles, one of said liquid mediums being raised to an elevated point as the result of bubbling the inert medium thereinto.

CURTIS C. COONS.
RUDOLPH S. NELSON.